United States Patent [19]
Ahlbrecht

[11] 3,818,074

[45] June 18, 1974

[54] FLUORINATED ESTERS

[75] Inventor: Arthur H. Ahlbrecht, Dellwood, Minn.

[73] Assignee: Minnesota Mining and Manufacturing Co., St. Paul, Minn.

[22] Filed: Apr. 20, 1973

[21] Appl. No.: 352,973

Related U.S. Application Data

[63] Continuation of Ser. No. 198,428, Nov. 12, 1971, abandoned, which is a continuation of Ser. Nos. 520,087, Jan. 12, 1966, abandoned, and Ser. No. 436,281, March 1, 1965, Pat. No. 3,285,975, which is a continuation of Ser. No. 79,172, Dec. 29, 1960, abandoned.

[52] U.S. Cl... 260/486 I, 117/139.5 A, 117/140 A, 117/142, 117/145, 117/155 UA, 260/85.5 H, 260/249.8, 260/289 R, 260/297 R, 260/408, 260/482 B, 260/483

[51] Int. Cl. ............................................ C07c 69/54
[58] Field of Search ................................ 260/486 A

[56] References Cited
UNITED STATES PATENTS

| | | | |
|---|---|---|---|
| 3,248,260 | 4/1966 | Langerak et al. | 260/486 H |
| 3,282,905 | 11/1966 | Fasick et al. | 260/486 H |

*Primary Examiner*—Lorraine A. Weinberger
*Assistant Examiner*—Paul J. Killos
*Attorney, Agent, or Firm*—Alexander, Sell, Steldt & DeLaHunt

[57] ABSTRACT

Unsaturated aliphatic acid esters of omega-perfluoroalkyl substituted alkanols having non-flammability, hydro- and oleophobic properties.

6 Claims, No Drawings

FLUORINATED ESTERS

This application is a continuation of copending application Ser. No. 198,428, filed Nov. 12, 1971, now abandoned, which was a continuation of copending application Ser. No. 520,087, filed Jan. 12, 1966, now abandoned, which was a continuation application of two then copending applications, Ser. No. 79,172, filed Dec. 29, 1960 (now abandoned) and Ser. No. 436,281, filed Mar. 1, 1965, now U.S. Pat. No. 3,285,975 said Ser. No. 79,172 being an application in part disclosing and claiming subject matter disclosed in an earlier filed application Ser. No. 677,229, filed Aug. 9, 1957 (now abandoned) with which Ser. No. 79,172 was copending, Ser. No. 436,281 being an application in part disclosing and claiming subject matter disclosed in an earlier filed application Ser. No. 247,357, filed Dec. 26, 1962 (now U.S. Pat. No. 3,171,861) with which Ser. No. 436,281 was copending, Ser. No. 247,357 being an application in part disclosing and claiming subject matter disclosed in two still earlier filed applications with which Ser. No. 247,357 was copending: application Ser. No. 664,911, filed June 11, 1957 (now U.S. Pat. No. 3,128,272) and application Ser. No. 677,229, filed Aug. 9, 1957 (now abandoned).

This invention relates to fluorinated esters and more particularly to unsaturated aliphatic acid esters of ω-perfluoroalkyl-substituted alkanols.

It is an object of this invention to provide a useful class of fluorinated esters of unsaturated aliphatic acids. It is another object of the invention to provide a novel class of polymerizable partially fluorinated esters. It is a further object of the invention to provide coatings, liners and gaskets which have exceptional utility in environment where nonflammability, hydro- and oleophobicity, a high degree of resistance to oils, fuels, lubricants, hydraulic fluids, etc., and maintenance of rubbery properties at extremely low temperatures are required. It is still another object of the present invention to provide polymers useful in sizing fibers and fabrics to confer both hydrophobic and oleophobic properties thereon.

It is another object of this invention to provide novel classes of fluorocarbon alkanols which have a variety of uses as chemical intermediates. Another object of the invention is to provide a process for the preparation of the perfluoroalkyl alcohols which are intermediates in the preparation of perfluoroalkyl acrylates and polymers thereof. Another object of the invention is to provide a process for the preparation of a class of intermediates in the preparation of certain perfluoroalkyl-substituted triazines and condensation products thereof with formaldehyde. Another object of the invention is to provide intermediates in the preparation of certain perfluoroalkyl-substituted halomethyl ethers and quaternary amine salt derivatives thereof. Still another object of the present invention is to provide intermediates in the preparation of certain carbamates. A further object of the invention is to provide intermediates in the preparation of certain perfluoroalkyl-substituted textile treatments. A further object of the invention is to provide intermediates in the preparation of thermosetting polymers possessing both oil and water repellent characteristics. A further object of the invention is to provide intermediates in the preparation of surface coating compositions of enhanced oil and water repellent characteristics. A further object of the invention is to provide processes for the preparation of certain perfluoroalkyl alcohols. Other objects of the invention will become apparent from the following specification.

The saturated fluorinated alcohols which contain a plurality of methylene groups but not more than 12 such groups between a perfluoroalkyl radical having from three to 12 carbon atoms and the hydroxyl group have the general formula:

$$R_f(CH_2)_m OH$$

wherein $R_f$ is a perfluoroalkyl group having from three to 12 carbon atoms and $m$ is 2–12. Normally $m$ is 3–12 herein. They can be prepared by various methods, e.g.,

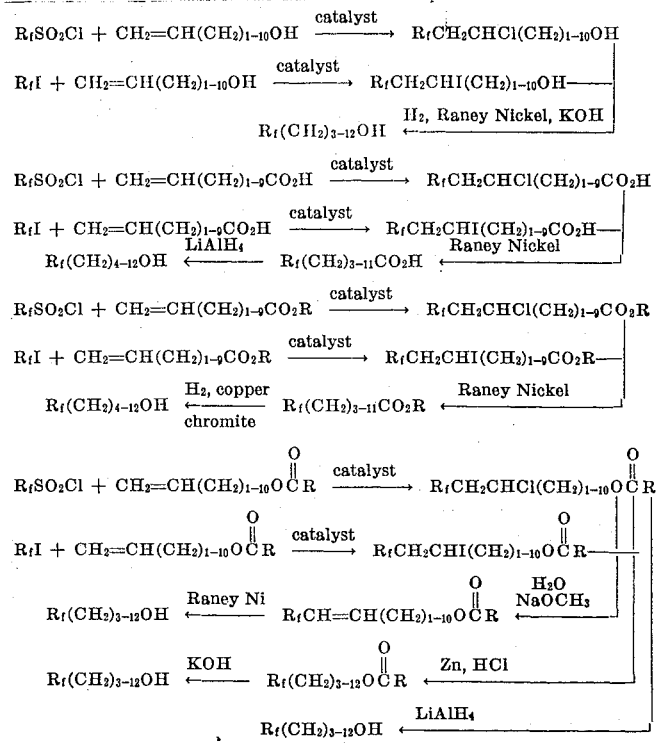

The unsaturated fluorocarbon alkanols can be represented by the general formula:

$$R_fCH=CH(CH_2)_nOH$$

wherein $R_f$ is a perfluoroalkyl group having from three to 12 carbon atoms and $n$ is 0–10.

The process for the preparation of the unsaturated alcohols and from them the saturated alcohols can be represented by the following structural steps:

$$R_fCH_2CHX(CH_2-_nOR \quad R_fCH=CH(CH_2-_nOR$$
$$R_f(CH_2)_mOH$$

wherein $R_f$, $m$ and $n$ are as previously defined, X is halogen other than fluorine (bromine, chlorine or iodine), R is hydrogen or $$\begin{array}{c} O \\ \| \\ -CR' \end{array}$$

and R' is lower alkyl (ordinarily butyl or lower). Preferably in the products and process of the invention $n$ is at least 1 (i.e., $m$ is at least 3).

Thus when R is hydrogen, this process involves a dehydrohalogenation step and a hydrogenation step. When R is the ester residue $$\begin{array}{c} O \\ \| \\ -CR', \end{array}$$

it also involves saponification (replacing the $$\begin{array}{c} O \\ \| \\ -CR' \end{array}$$

with H). Depending upon the conditions selected at various steps in the reaction, this saponification (or hydrolysis) can occur during the dehydrohalogenation or during the hydrogenation. If it is desired to saponify during the dehydrohalogenation, water or an alcoholic solvent (such as methanol, ethanol or propanol) is added. If the ester moiety is to be retained in the unsaturated intermediate, water and alcohols are excluded during the dehydrohalogenation.

Regardless of whether R is hydrogen or an ester residue the dehydrohalogenation and hydrogenation steps can be carried out separately and the alcohols $$R_fCH=CH(CH_2)-_nOH$$

can be isolated. Thus the unsaturated alcohols are products of the first step of the process and are intermediates in the preparation of the saturated alcohols which are produced by the hydrogenation. The dehydrohalogenation can be conveniently carried out by treating the halogenated precursor with sodium methylate or other similar reagent. The unsaturated intermediate can then be hydrogenated, for instance, by dissolving it together with an excess of an alkali metal hydroxide in a solvent (e.g., a lower aliphatic alcohol or a mixture of water and a lower aliphatic alcohol) and subjecting the solution to hydrogen at a relatively high pressure (e.g., 500 to 5000 psi) in the presence of a hydrogenation catalyst such as Raney nickel. Preferably, this is done at a temperature of 100–200°C. although lower or higher temperatures can be used.

The dehydrohalogenation and hydrogenation steps of the process can also be carried out together, e.g., by subjecting the halogenated precursor to hydrogen at a relatively high pressure in the presence of Raney nickel under basic conditions as previously disclosed. These variations are considered to be within the scope of the process of the invention, as represented above.

The precursor halogenated alcohols and esters are available by desulfonylatively reacting a perfluoroalkanesulfonyl chloride, a perfluoroalkanesulfonyl bromide or a perfluoroalkyl iodide with a distally unsaturated alkenol or an ester thereof. The precursor halogenated alcohols can also be prepared by saponification of the corresponding halogenated esters.

A number of the unsaturated alcohols and the corresponding saturated alcohols are given in the following table:

| Unsaturated Alcohol | Saturated Alcohol |
| --- | --- |
| 3-(perfluorobutyl)propen-2-ol-1 | 3-(perfluorobutyl)propanol-1 |
| 3-(perfluorooctyl)propen-2-ol-1 | 3-(perfluorooctyl)propanol-1 |
| 3-(perfluorododecyl)propen-2-ol-1 | 3-(perfluorododecyl)propanol-1 |
| 4-(perfluorooctyl)buten-3-ol-1 | 4-(perfluorooctyl)butanol-1 |
| 5-(perfluoropropyl)penten-4-ol-1 | 5-(perfluoropropyl)pentanol-1 |
| 5-(perfluorobutyl)penten-4-ol-1 | 5-(perfluorobutyl)pentanol-1 |
| 5-(perfluorooctyl)penten-4-ol-1 | 5-(perfluorooctyl)pentanol-1 |
| 5-(perfluorododecyl)penten-4-ol-1 | 5-perfluorododecyl)pentanol-1 |
| 6-(perfluorodecyl)hexen-5-ol-1 | 6-(perfluorodecyl)hexanol-1 |
| 7-(perfluorooctyl)hepten-6-ol-1 | 7-(perfluorooctyl)heptanol-1 |
| 8-(perfluorobutyl)octen-7-ol-1 | 8-(perfluorobutyl)octanol-1 |
| 8-(perfluorooctyl)octen-7-ol-1 | 8-(perfluorooctyl)octanol-1 |
| 8-(perfluorododecyl)octen-7-ol-1 | 8-(perfluorododecyl)octanol-1 |
| 11-(perfluorobutyl)undecen-10-ol-1 | 11-(perfluorobutyl)undecanol-1 |
| 11-(perfluorooctyl)undecen-10-ol-1 | 11-(perfluorododecyl)undecanol-1 |
| 11-(perfluorododecyl)undecen-10-ol-1 | 11-(perfluorododecyl)undecanol-1 |
| 11-(perfluoro-4-ethyl cyclohexyl) undecen-10-ol-1 | 11-(perfluoro-4-ethyl cyclohexyl) -undecanol-1 |
| 12-perfluorobutyl)dodecen-11-ol-1 | 12-(perfluorobutyl)-dodecanol-1 |
| 12-(perfluorooctyl)dodecen-11-ol-1 | 12-(perfluorooctyl)dodecanol-1 |
| 12-(perfluorododecyl)dodecen-11-ol-1 | 12-(perfluorododecyl)-dodecanol-1 |

The saturated alcohols are extremely valuable and versatile as chemical intermediates. Among the classes of materials which can be prepared from them are:

A. Acrylate-type esters and polymers thereof.

B. Triazines carrying an ω-perfluoroalkyl group and condensation products thereof with formaldehyde.

C. ω-Perfluoroalkyl halomethyl ethers and quaternary amine salts thereof.

D. Carbamates produced by reaction of isocyanates with the alcohols of this invention.

A. The acrylate-type esters of the invention are prepared by esterifying the saturated alcohols with acrylic acid or methacrylic acid. These esters have the general formula:

$$R_f-(CH_2)_mOCOC(R'')=CH_2$$

wherein $R_f$ and $m$ are as previously defined herein (i.e., $R_f$ is a perfluoroalkyl group having from three to 12 carbon atoms and $m$ is 2–12, $m$ being ordinarily 3–12) and $R''$ is hydrogen or methyl. These monomers are readily polymerized by methods known to the art, for example, by bulk polymerization, solution polymerization and emulsion polymerization, using catalysts such as benzoyl peroxide or other free radical polymerization initiators. The resulting polymers, including both homopolymers and copolymers, are characterized by the presence in the skeletal chain of repetitive or recurring units which can be represented as follows:

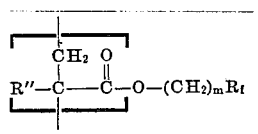

When fibers are coated with these polymers, oil and water resistance are imparted to the fibers whether in the form of a woven fabric or cloth, or in the form of a random web as in paper or felt.

The ω-perfluoroalkyl acrylates of which the intermediate hydrocarbon chain is relatively short (e.g., those of which the value of $m$ is 3, 4 or 5) form rubbery homopolymers having superior flexibility at extremely low temperatures combined with good resistance to oils, fuels, hydraulic fluids, lubricants, common organic solvents, etc., over a wide range of temperatures and nonflammability in the sense of not supporting combustion. These properties make them unusually well suited for use in certain highly demanding low temperature applications, such as gaskets and lines in high-performance aircraft. The ω-perfluoroalkyl acrylates of which the intermediate hydrocarbon chain is a relatively long (e.g., those of which the value of $m$ is 10–12), however, form waxy homopolymers.

The homopolymers of our acrylate monomers can be cured with oxides of bivalent metals (such as magnesium oxide and lead oxide), as well as by using a hydrate of an alkali-metal silicate (such as Na CHL2SiO$_3$·9H$_2$O) in combination with a base (such as calcium hydroxide). Another procedure is to vulcanize with a polyfunctional amine curing agent (such as triethylenetetramine) in admixture with a reinforcing pigment (such as carbon black). Molded, extruded and cast articles of varied and useful shapes can be manufactured. Copolymers formed with dienes (for instance copolymers with butadiene) can be cured with conventional sulfur recipes as well as by using the metal oxide and the silicate formulas.

Both the rubbery and the waxy homopolymers of the ω-perfluoroalkyl acrylates are valuable for sizing fabrics to impart both repellency to water and resistance to absorption and soiling by oily and greasy materials, and for other purposes. The polymers are all highly insoluble in hydrocarbons and other common organic solvents as well as in water but are soluble in fluorinated solvents, such as fluorocarbon acids and esters, benzotrifluoride, and xylene hexafluoride. Coatings of the solid polymers can be applied from solution or emulsion to provide firmly bonded surface coatings or sizings on textile fibers (natural or synthetic) yarns, cloths and other fabrics, paper, etc. Due to the orientation of the polymer molecules, the fluorocarbon "tails" provide an inert fluorocarbon-like outer surface which is both hydrophobic and oleophobic. The treatment of textile fabrics can be conducted so that the treated fabric has an imperceptible sizing coating on the fibers which does not materially affect porosity, flexibility, feel and hand, strength, appearance or color. The sizing is tightly bonded to the fibers.

Copolymers of the ω-perfluoroalkyl acrylates (this term being intended to include the ω-perfluoroalkyl methacrylates) with, for example, such comonomers as vinyl chloride, vinyl stearate, styrene, butadiene, acrylonitrile, isoprene, vinyl ethers, acrylates, methacrylates and halogenated derivatives of such monomers such as perfluorobutadiene and fluoroprene, and the like can be prepared. When fibers are coated with these homopolymers or with their copolymers the perfluoroalkyl "tail" is apparently preferentially exposed on the outer surface of the fiber, thereby imparting oil resistance and water resistance to the fibers whether in the form of a woven fabric or cloth, or in the form of a random web as in paper or felt.

B. The triazines which are produced from the saturated alcohols have the general formula:

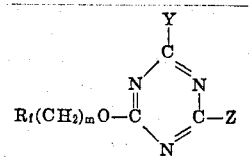

wherein $R_f$ and $m$ are as previously defined herein and Y and Z are amino or hydrazino radicals. These triazines are prepared by condensing an alcohol according to the present invention with a mono-halogenated triazine derivative, for example, with 2,4-diamino-6-chloro-s-triazine (formed by partial reaction of commercially available cyanuric chloride with ammonia, as described in the Journal of the American Chemical Society, Vol. 73, pages 2981–2983). The 2,4-dihydrazino-6-(ω-perfluoroalkyl alkyloxy)-s-triazines are prepared by reacting a saturated alcohol produced by the process of the invention with cyanuric chloride and by then reacting the two remaining chlorine atoms on the triazine nucleus with hydrazine.

The perfluoroalkyl group-containing triazines are useful intermediates for the preparation of polymeric substances by condensation with formaldehyde. The polymeric materials thus produced are thermosetting resins which exhibit oil and water repellent characteristics. They can be cast in the form of thin sheets or films which have these properties, or they can be employed as coatings; for example on fibrous substrates such as paper, textiles such as cotton, wool, linen, silk and synthetic fibers, non-woven mats or webs of fibers and felt.

Additionally, the substituted triazines can be used as curing agents for epoxy resins, whereby the cured resins have increased oil and water repellency. The formaldehyde condensation products can be conveniently produced by refluxing together for from one to 4 hours concentrated aqueous formaldehyde and the perfluoroalkyl group-containing triazine.

C. The saturated alcohols are also useful as intermediates in the preparation of halomethyl ethers of the type:

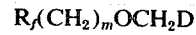

wherein D is chlorine or bromine. These compounds in turn can be reacted to form quaternary amine salts of the type:

$R_f(CH_2)_mOCH_2Q^+D^-$ wherein Q is the radical of a tertiary nitrogenous base. The halomethyl ethers are prepared by reaction of formaldehyde and hydrogen halide, e.g., hydrogen bromide or hydrogen chloride, with the corresponding fluorinated alcohol to produce a halomethyl ether, which is not necessarily isolated when quaternization is to be effected, but is readily quaternized directly by addition of a tertiary amine such a pyridine. This procedure is conveniently carried out by passing the selected anhydrous hydrogen halide in gaseous form into a solution of the alcohol and paraformaldehyde in an inert solvent, such as toluene, benzene and the like until there is substantially no further absorption of the hydrogen halide. As the reaction is not strongly exothermic, no temperature control is required, although heating from about 25° C. to 100° C. (depending to an extent on the boiling point of the solvent used) may be resorted to, to insure completion of the reaction. Another procedure which is very convenient since it avoids the use of hydrogen halide is to react the alcohol and paraformaldehyde with the hydrohalide of the tertiary nitrogenous base, e.g., pyridine hydrochloride, in a suitable solvent such as the base. Isolation of the quaternary salt is then carried out as above adding, if desired, a further amount of an organic solvent such as e.g., ether. The two procedures are to be considered equivalent.

Without isolation of the intermediate halomethyl ether, quaternization is effected in the inert solvent employed for the previous reaction after brief evaporation to remove excess hydrogen halide, or the reaction mixture may be further evaporated and some other solvent, such as anhydrous ether or dioxane, in which the quaternary salt is insoluble, may be added. The desired tertiary organic base or amine is then added in the stoichiometric amount while maintaining the reaction mixture at a temperature in the range of about 25° C. to about 100° C. Any tertiary nitrogenous organic base which is capable of forming a salt or quaternary compound is suitable for this purpose, including, for example, trialkyl amines, such as trimethylamine, tributylamine and tridodecylamines; cycloalkyl amines such as tricyclohexylamine; aryl alkyl amines such as benzyl dimethyl amine; alkarylamines such as dimethyl aniline; and heterocyclic amines as pyridine, picoline, lutidine, quinoline, and the like. Pyridine is particularly preferred for convenience and economy in formation of cloth-treating agents as shown above.

These quaternized compounds are employed for treating woven or non-woven fibrous materials including wool, cotton, rayon, acetate, nylon and the like textiles, or paper, leather, wood, felt and similar organic fibrous constructions, and particularly cellulosic materials, by applying the selected quaternary ammonium derivatives, in aqueous medium buffered to about pH 6 to the cloth, removing any excess, drying at a temperature in the range of about 40° to 100° C., and heating the dry material to about 100° to 140° C. for a period of the order of about 5 to 30 minutes to fix the finish. Thereafter the material is desirably washed in a mildly alkaline aqueous solution to remove any residual acidic material, and dried.

D. The saturated alcohols are useful for the preparation of carbamates by reaction with mono- or polyisocyanates.

In order more clearly to disclose the nature of the present invention, a number of specific examples will now be described. It should be understood, however, that this is done solely by way of illustration and is intended neither to delineate the scope of the invention nor limit the ambit of the appended claims. All parts are by weight in the examples unless otherwise specified.

EXAMPLE 1

The preparation of $C_8F_{17}CH_2CHClCH_2OH$ from perfluorooctane sulfonyl chloride and allyl alcohol is given in Example 8a of U.S. Pat. No. 2,965,659. 3-(Perfluorooctyl)-propanol is prepared from this adduct as follows:

The adduct and approximately a four-fold molar excess of sodium hydroxide are dissolved in a solvent of equal parts of water and ethanol and the solution is charged to a rocking high-pressure hydrogenation apparatus in the presence of Raney nickel catalyst. Hydrogenation is carried out at a temperature of about 130° C. with hydrogen supplied at 2,500 psi pressure. The reduction mixture is filtered free of the catalyst and the filtrate evaporated to remove the solvent. The residue is dissolved in ether and the ethereal solution washed with dilute hydrochloric acid and dried.

Vaccum distillation gives 3-(perfluorooctyl)-propanol, b.p. 105–112°/9–10 mm Hg.

5-(Perfluorooctyl)-pentanol is prepared by reaction of perfluorooctanesulfonyl chloride and penten-4-ol-1 in the presence of ditertiary butyl peroxide and subsequent catalytic dehydrohalogenation.

EXAMPLE 2

The production of 10-chloro, 11-(perfluorooctyl)-undecanoic acid and 2-chloro-3-(perfluorooctyl)-propionic acid is described in Examples 2 and 11 of U.S. Pat. No. 2,965,659. 4-Chloro, 5-(perfluorooctyl)-pentanoic acid is prepared in an analogous manner, as follows:

A mixture of 26.8 g. (0.052 moles) of perfluorooctanesulfonyl chloride and 5.0 g. (0.050 moles) of 4-penetenoic acid (allyl-acetic acid) is refluxed for 4 hours at about 120–145° C. in the presence of a catalytic amount (1.0 g.) of di-tertiary butyl peroxide. The reaction mixture is fractionally distilled under reduced pressure and the fraction boiling at about 100° C. at 0.01 mm. is collected. After recrystallization from a mixture of chloroform and carbon bisulfide, the 4-chloro-5-(perfluorooctyl)-pentanoic acid thus prepared melts at about 89–90° C.

The 4-chloro-5-(perfluorooctyl)-pentanoic acid thus prepared is hydrogenated by shaking a solution of 8.00 g. (0.0145 moles) of the acid and 2.5 g. (0.062 moles) of sodium hydroxide in a mixture of 30 ml. of water and 30 ml. ethanol for 3 hours at 140° C. in a rocking high-pressure hydrogenation apparatus, in the presence of 4 g. of Raney nickel catalyst and with hydrogen supplied at 2,500 psi pressure. After removal of the catalyst and evaporation to dryness, an amorphous residue is obtained comprising sodium 5-(perfluorooctyl)-pentanoate. By dissolving this residue in water followed by acidification of the resulting solution, 5-(perfluorooctyl)-pentanoic acid is recovered as a waxy white solid, which can be distilled at 100° C. at 0.02 mm. pressure. After recrystallization from carbon bisulfide, the acid melts at about 86.5–87.3° C.

The procedure described in U.S. Pat. No. 2,666,797, using lithium aluminum hydride, is employed for reduction of the acids to the corresponding alcohols. Thus, a suspension in ether of 30 parts of 5(perfluorooctyl)-pentanoic acid is added to a solution of 3 parts of lithium aluminum hydride in about 200 parts of anhydrous ether. The reaction mixture is stirred for about 48 hours and then is treated with water and neutralized with sulfuric acid. The reaction mixture is extracted several times with ether, and the ether extracts are combined, dried and fractionally distilled in vacuo. There is obtained 5-(perfluorooctyl)-pentanol boiling at about 108° C. at 2.5 mm. Hg.

In the same way, using 10-undecenoic acid in preparation of the perfluoro acid instead of allyl-acetic acid, there is produced 11-(perfluorooctyl)-undecanoic acid, which on reduction yields 11-(perfluorooctyl)-undecanol boiling at about 122–126° C. at 0.10–0.15 mm. Hg.

By repeating the foregoing procedure, employing perfluoro-n-pentanesulfonyl chloride and perfluorododecane-sulfonyl chloride (prepared by the process of Brice et al. as disclosed in U.S. Pat. No. 2,732,398) instead of perfluorooctanesulfonyl chloride, there are obtained, respectively, 5-(perfluoropentyl)-pentanoic acid and 5-(perfluorododecyl)-pentanoic acid. Likewise, when 3-butenoic acid, 6-heptenoic acid and 10-undecenoic acid are employed instead of 4-pentenoic acid in carrying out the procedure of this example, there are obtained, respectively, the corresponding 4-(perfluorooctyl)-butyric acid, 6-(perfluorooctyl)-heptanoic acid and 11-(perfluorooctyl) hendecanoic acid. Upon reduction, these acids yield the corresponding 5-(perfluoropentyl)-pentanol, 5-(perfluorododecyl)-pentanol, 4-(perfluorooctyl)-butanol, 7-(perfluorooctyl)-heptanol and 11-(perfluorooctyl)-hendecanol, respectively.

EXAMPLE 3

The desulfonylative addition of a perfluoroalkane sulfonyl chloride to an ester of an alkanol is disclosed in U.S. Pat. No. 2,965,659. An example is as follows:

To a mixture of 80 g. of perfluorooctane sulfonyl chloride and 31 g. of allyl acetate are added about 3 g. of ditertiary butyl peroxide and the reaction mixture is slowly heated to about 80° C., whereupon a spontaneous rise in temperature to about 130° C. occurs. After this reaction is over there is added a further amount of the di-tertiary butyl peroxide. Heating is continued for about 14 hours at about 110° C. with a further addition of peroxide after about 8 hours of heating. The reaction mixture is then fractionally distilled in vacuo, and the 2-chloro-3-(perfluorooctyl)propyl acetate which is formed in the reaction is recovered, as a fraction boiling at about 153–158° C. at 37 mm. pressure. To a solution of 50.5 g. of this substance in 50 ml. of anhydrous methanol containing phenolphthalein indicator is added slightly more than the theoretical amount of sodium methylate in methanol solution. The reaction mixture becomes slightly pink and sodium chloride is precipitated. After standing about 48 hours at room temperature, the reaction mixture is treated with about 10 ml. of water and an additional amount of sodium methylate, and then warmed to about 50° C. for about 4 hours. The organic phase is then removed and fractionally distilled, the fraction boiling over the range 129–141° C. at 37 mm. pressure of mercury being recovered. The 3-(perfluorooctyl) propen-2-ol-1 (i.e., 3-(perfluorooctyl) allyl alcohol) thus prepared has index of refraction $n_D^{23} = 1.3328$. The boiling point of this alcohol is 62–65° C./0.08 mm. Hg.

A mixture of 42 g. of 3-(perfluorooctyl) allyl alcohol, 1.8 g. of Raney nickel, 45 ml. of ethanol and 1 g. of potassium hydroxide is charged to an autoclave and hydrogen under about 150 atmospheres pressure is introduced. Hydrogenation to the corresponding saturated alcohol takes place as evidenced by a drop in pressure over a period of about 1 hour. The contents of the autoclave are removed, filtered, and the filtrate is fractionally distilled in vacuo. There is obtained 3-(perfluorooctyl)-propanol, which boils at about 138–143° C. at 38 mm. pressure and has index of refraction $n_D^{24} = 1.3312$. The infra-red spectrogram of this substance indicates that it is completely saturated.

Alternatively, the chlorinated acetate adduct $C_8F_{17}CH_2CHClCH_2OCOCH_3$ can be refluxed in an inert solvent with a tertiary amine such as triethylamine to form the quaternary chloride salt. This salt can then be heated to eliminate triethylamine hydrochloride to form the unsaturated acetate. Similarly iodinated and brominated intermediate esters of the process of the invention can be dehydrohalogenated to form the corresponding unsaturated esters. These unsaturated esters can be hydrogenated and hydrolyzed to form the saturated alcohols.

EXAMPLE 4

About 65.0 g. (0.125 m) of $C_8F_{17}SO_2Cl$, 23.5 g. (0.137 m) of $CH_2{=}CH(CH_2)_{-9}OH$ and 0.2 g. of azobisisobutyrlnitrile are heated with stirring to 85° C. At that temperature, a rapid exotherm to 160° C. occurs, accompanied by an extremely rapid evolution of $SO_2$. After the reaction has subsided, 2 ml. of di-t-butylperoxide are added and the temperature is maintained at 130–140° C. until gas evolution has ceased. The flask is cooled to 75° C. and evacuated to remove residual $SO_2$.

To a crude adduct, $C_8F_{17}CH_2CHCl(CH_2)_{-9}OH$ is added a solution of 14.0 g. of KOH in 50 ml. of absolute ethanol. The mixture is stirred at 50° C. for 2 hours and allowed to stand at room temperature for 15 hours. The salts are removed by suction filtration, then the ethanol and water are distilled off at 80° C. under vacuum (15 mm. Hg.). The residue is taken up in ether, washed with water and dried over $MgSO_4$. Vacuum distillation gives 52.5 g. (71.5 %) of a colorless liquid $C_8F_{17}CH{=}CH(CH_2)_9OH$ ((11-perfluorooctyl) undecen-10-ol-1) b.p. 121–125° C/0.08 mm. Hg.; $n_D^{25} = 0.3770$.

In a similar manner 11(perfluorododecyl)-undecanol is prepared by the dehydrohalogenation of 10-bromo-11-(perfluorododecyl)undecylacetate (prepared according to the process of U.S. Pat. No. 2,965,659) to form 11-perfluorododecyl-10-undecen-1-ol

$C_{12}F_{25}CH = CH(CH_2)_9OH$ which is in turn hydrogenated in an autoclave at high pressure and in the pressure of Raney nickel to form 11-(perfluorododecyl)-undecanol.

3-(Perfluoropropyl)-propanol is prepared by the dehydrohalogenation of $C_3F_7CH_2CHICH_2OH$ (which is prepared by reaction of perfluoropropyl iodide with allyl alcohol) to form $$C_3F_7CH = CHCH_2OH$$

and hydrogenation as above to form the 3-(perfluoropropyl)-propanol.

5-(Perfluorooctyl)-pentanol is prepared by the dehydrohalogenation of $C_8F_{17}CH_2CHBr(CH_2)_3OH$ (prepared by the process of U.S. Pat. No. 2,965,659) to form $$C_8F_{17}CH = CH(CH_2)_3OH$$

and hydrogenation as above to form the 5-(perfluorooctyl)-pentanol.

EXAMPLE 5

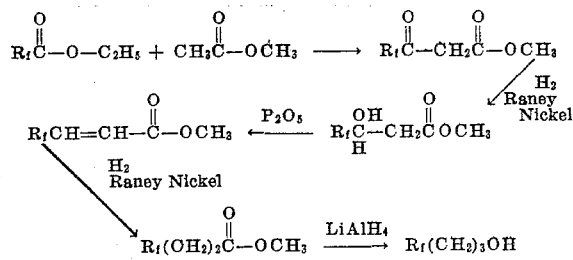

3-(Perfluoropropyl)-propanol is prepared starting with ethyl perfluorobutyrate as follows:

Approximately equimolar quantities of ethyl perfluorobutyrate, methyl acetate and sodium methoxide are used. The ethyl perfluorobutyrate is added to a cooled solution of sodium methoxide in absolute ether, with continued cooling. After stirring this mixture for approximately 2 hours the methyl acetate is added, whereupon a clear solution forms. The solution is stirred for approximately 16 hours and then fractionally distilled under reduced pressure, to remove solvents and to obtain methyl 3-(perfluoropropyl)-3-keto propionate as the main product. The keto-ester thus obtained is hydrogenated under pressure with Raney nickel catalyst, in ether solution for about 2 hours. The catalyst is removed by filtration and the filtrate is fractionally distilled in vacuo, whereupon methyl-3-(perfluoropropyl)-3-hydroxy propionate is recovered, boiling at about 85° C. at 15 mm. pressure and having refractive inex $n_D^{25} = 1.3513$. About 157 parts of the hydroxy ester thus obtained and 175 parts of phosphorus pentoxide are mixed and allowed to stand for approximately 16 hours (a rather strong exothermic reaction being noted shortly after mixing). The reaction mixture is then filtered and the filtrate is purified by fractional distillation. There is obtained methyl-3-(perfluoropropyl)acrylate which boils at 121–124° C. at 732 ml. pressure and has a refractive index $n_D^{25} = 1.3362$. The acrylic ester is hydrogenated in ether solution using Raney nickel catalyst and high pressure under the usual conditions. The reaction mixture is filtered and the filtrate is fractionally distilled under reduced pressure. There is obtained the corresponding saturated ester, methyl 3-(perfluoropropyl) propionate, which boils at 42° C. at 12 mm. pressure and has refractive index $n_D^{25} = 1.3276$. To a solution of 7.6 g. (.2 mole) of lithium aluminum hydride in 500 ml. of ether are added 49 g. (0.191 mole) of the methyl-3-(perfluoropropyl)-propionate dissolved in 100 ml. of ether, at such a rate that vigorous refluxing is maintained. The mixture is then stirred for 1 hour and an excess of methanol is added to hydrolyze the complex. The reaction mixture is next acidified with dilute sulfuric acid. The ether layer is separated and the aqueous layer is further extracted with about an equal volume of ether. The combined ether phases are evaporated to remove the ether and the residue is fractionally distilled. The 3-(heptafluoropropyl)-propanol thus obtained boils at about 140°–141° C. at 745 mm. pressure and has index of refraction $n_D^{24} = 1.3270$.

EXAMPLE 6

The alcohols are readily converted to the corresponding acrylate and methacrylate esters by reacting them with acrylic acid and methacrylic acid or derivatives thereof (e.g., acrylyl chloride and methacrylyl chloride) using conventional esterification methods. The acrylate-type esters, i.e., monomers, shown in the following table are prepared in this manner from the respective alcohols and acrylic acid or methacrylic acid except monomer E which is prepared from the alcohol and methacrylyl chloride.

| Monomer Designation | Monomer | Characteristics |
|---|---|---|
| A | 3-(perfluorooctyl)-propyl acrylate | Viscous, virtually colorless liquid $n_D^{25}$ 1.3421 |
| | | Calculated: C 31.5% F 60.6% |
| | | Found: C 31.3% F 59.9% |
| B | 11-(perfluorooctyl)-undecyl acrylate | Solid, infrared spectrum shows expected structure, melting point of about 28–36° C. |
| C | 11-(perfluorooctyl)-undecyl methacrylate | Tan, pasty solid melting at about 23–27° C. |
| D | 3-(perfluoropropyl)-propyl acrylate | Boiling point 75–76°/10 mm, shows expected infrared absorption maxima and has $n_D^{23}$ of 1.3562 |
| E | 3-(perfluoropropyl)-propyl methacrylate | Boiling point 70–73°C/10 mm, $n_D^{25}$ 1.3636 |
| | | Calculated: C 40.5% F 45.0% |
| | | Found: C 40.2% F 45.0% |
| F | 5-(perfluorooctyl)-pentyl methacrylate | Boiling point 102–104°C/0.1 mm, |
| | | Calculated: C 35.6% F 56.3% |
| | | Found: C 35.3% F 55.7% |

These acrylate-type monomers are readily polymerized by methods known to the art, for example, by bulk polymerization, solution polymerization and emulsion polymerization, using catalysts such as benzoyl peroxide or other free radical polymerization initiators. Thus, monomer A is bulk polymerized by adding 0.5% benzoyl peroxide to the monomer and heating at 50° C. for 2.5 hours to form a rather tough rubber.

Monomers A through F are emulsion polymerized, the procedure and the amounts of ingredients employed being as follows except as otherwise specified:

A suitable vessel is charged, frozen in liquid air, evacuated to a pressure of less than 0.01 mm. of mercury, thawed and refrozen, reevacuated and finally sealed. The vessel is then agitated in a 500° C. water bath for from about 15 to 18 hours. The charge, except where otherwise specified, is 100 parts by weight of monomer, 5 parts of emulsifier, one-half part of potassium persulfate and 180 parts of medium. The results of these various runs are summarized in the following table:

| Mono-mer | Emulsi-fier | Medium amt. | Conversion to latex,% | Remarks | (λ)(2) | Polymer |
|---|---|---|---|---|---|---|
| A | (1) | Water 108 Methanol 72 | 68 | Clear blue latex contg. no pre-coagulum | 0.35 | I |
| A | (3) | Water 128 Acetone 54 | 82 | Blue, slight-ly cloudy, trace of precoagulum | 0.40 | II |
| B | (3) | Same | 96 | (11) Slightly tan, some pre-coagulum | 0.14 | III |
| C | (3) | Same | 86 | (11) Slightly tan, some pre-coagulum | 0.12 | IV |
| D | (4) | Water 180 | — | (5) | — | V |
| E | (6) | Same | — | Bluish latex | — | VI |
| F | (3) | Water 126 acetone 54 | — | Clear, blue latex | 1.06 | VII |
| F | (7) | Same | — | — | — | VIII |
| D | (4) | Water 180 | | (8) | | IX |
| A | (4) | Water 126 Acetone 54 | — | — | — | X |
| A | (9) | Same | 88 | (10) | — | XI |

(1) potassium 11-perfluorooctylhendecanoate
(2) Inherent viscosity in 1:2 acetone-methyl perfluorobutyrate
(3) Potassium N-ethyl-2-(perfluorooctanesulfonamido)-acetate
(4) Sodium lauryl sulfate
(5) 3.2 parts of emulsifier and ¼ part of potassium persulfate used. Reaction time 5 hours. Latex then frozen to coagulate.
(6) Dodecylamine hydrochloride
(7) Dodecyl trimethyl ammonium chloride
(8) 3 parts of emulsifier
(9) $C_8F_{17}SO_2NH(CH_2)_3N(CH_3)_2 \cdot HCl$
(10) 0.2 part of potassium persulfate
(11) Polymerization carried out in an atmosphere of nitrogen.

Certain of these latexes (emulsions) are applied to various types of cloth and the treated cloths tested for water- and oil-repellency. The test procedures used, except where otherwise specified are as follows:

A seven by seven inch square of test cloth is treated by padding thereon the emulsion diluted to 1 percent solids with water so that about 1 percent of polymer (based on fabric weight) is present in the fabric. The treated fabric is then dried 10 minutes at 140° C. and tested for resistance to water and oil.

Hydrophobic properties of the treated cloth are determined by Method 22–52 of the American Association of Textile Chemists and Colorists as described, for example, on pages 136–138, inclusive, of the Technical Manual and Yearbook of that association for the year 1954. It is to be noted that this method provides for no interpolation of results which are reported as one of the Standard Spray Test ratings 0, 50, 70, 80, 90 and 100.

Oleophobic properties are measured by means of ratings assigned to the basis of resistance for 3 minutes to drops of oil-turpentine mixtures varying by 10 percent increments from pure mineral oil (Nujol, stanolind, etc.) to pure turpentine applied gently to the surface of the textile held in a horizontal position. The rating given corresponds to the test mixture of the highest turpentine content repelled. Thus, 10 indicates that a mixture of 0 percent oil- 100 percent turpentine fails to penetrate the cloth within 3 minutes; the rating 1 indicates that a mixture of 90 percent oil- 10 percent turpentine fails to penetrate the cloth within 3 minutes, etc.

The results are as follows:

| Latex | Cloth | Spray Rating | Oil Repellency Rating |
|---|---|---|---|
| I | Cotton | 50 | 3–7 |
| I | Visa (1) | 80 | 10 (2) |
| II | Cotton | 50 | 10 |
| II | Visa | 70 | 10 (2) |
| III | Cotton | 70 | 4.5 |
| III | Visa | 100 | 7 |
| IV | Cotton | 70 | 2 |
| IV | Visa | 100 | 6 |
| VI | Cotton | 80 | — |
| VI | Visa | 80 | (3) |
| VII | Cotton | 50 | 90 (4) |
| VII | Visa | 100 | 100 (4) |
| VII | Low Acid Wool | 80 | 90 (4) |
| VII | High Acid Wool | 90 | 80 (4) |

(1) Visa is the tradename of Deering-Milliken and Co., Inc. for a fabric consisting of a blend of 45% wool and 55% polyethylene terephthalate fibers.
(2) Properties not lost on repeated dry cleaning.
(3) Significant
(4) Oil repellency ratings based on failure of penetration of mixtures of mineral oil ("Nujol") and n-heptane for 3 minutes. The ratings corresponding to the highest percentages (by volume) of heptane repelled are: no hold out to mineral oil, 0; 0% heptane, 50; 20% heptane, 70; 30% heptane, 80; 40: heptane, 90; 50% heptane, 100; 60% heptane, 110; 70% heptane, 120.

Additional cloth treatment tests are carried out utilizing latex XI as follows:

The latex is diluted with water to approximately 1 percent solids and a number of samples of cotton print cloth, cotton gingham and cotton twill are immersed therein. The cloth samples are then removed, run between nip rolls to remove the excess treating bath and dried for 10 minutes at 140–150° C. The dried treated cloth samples contain about 1 percent of polymer (based on the fabric weight). The treated samples are then divided into three groups. The first group is tested immediately for resistance to oil and water, the second group is immersed in anhydrous hydrazine at 25° C. for 2½ minutes, washed with water and dried for 4 minutes at 150° C. before being tested for resistance to water and oil and the third group is immersed in 10 percent aqueous sodium hydroxide at 75° C. for 2½ minutes, washed with water and dried for 4 minutes at 150° C. before being tested for resistance to oil and water. The oil repellency rating test used is that described in Footnote (4) of the previous table and the ink resistance test is as follows:

A drop of ink is dropped on the treated fabric from a height of 2 inches and the drop is immediately removed by blotting with an absorbent tissue. A cloth sample in which there is no staining or a very faint staining at the point of impact is rated "good", a sample in which a clear imprint of the whole drop of ink remains is rated "fair", a sample in which the ink color appears to have spread slightly from the original outline of the drop is rated "poor" and a sample in which the drop of ink has soaked into the fabric before the blotting is rated "N.R." (No Resistance). The results of these tests are as follows:

| Latex | Cloth | initial Oil | Ink | Hydrazine Oil | Ink | Sodium Hydroxide Oil | Ink |
|---|---|---|---|---|---|---|---|
| XI | Cotton print cloth | 100+ | good | 80 | good | 80+ | good |
| XI | cotton gingham | 100+ | good | 70— | fair | 60 | good |
| XI | cotton twill | 110+ | good | 100+ | good | 100 | good |

The foregoing table shows the excellent resistance to bases of these treatments. The resistance to base hydrolysis of these polymers can be tested directly as follows:

The ampoule in which the latex is prepared is opened and an equal volume of 28 percent aqueous ammonia is added. The ampoule is resealed, rotated end over end for 18 hours at 50° C., opened and the latex coagulated by pouring it into acetone. The polymeric material is recovered, washed and dried and analyzed for nitrogen. A very low nitrogen content indicates a high degree of resistance to ammonolysis (alkaline hydrolysis) while higher nitrogen content indicates a lower resistance to ammonolysis. Latexes IX and X are found to have excellent resistance to base hydrolysis according to this test (nitrogen contents of 0.08 and 0.14 wt. percent respectively determined according to the test).

As noted previously, latex V is coagulated by freezing. The resulting polymer is separated, washed and dried and is found to have an inherent viscosity in 2:1 acetone:methylperfluorobutyrate of 2.3. The refractive index vs. temperature plot was prepared for this material according to the glass transition temperature procedure but was discontinued at −39° C. Since no change of slope was observed in the curve in that temperature range, the $T_g$ for the polymer is below −39° C., although its exact value has not been determined.

A portion of the rubber coagulated from latex V is cured by blending 100 parts of polymer with 6.72 parts of sodium silicate nonahydrate and 2.72 parts calcium hydroxide followed by heating at 310° C. in a press at 900 pounds pressure for 20 hours. A rubbery elastomer showing good resistance to oils is obtained, which, when prepared in sheet form, is useful for preparing gaskets, cap liners and the like.

The cured rubber shows a flexing resistance tenfold that at room temperature ($T_{10}$) of −11° as determined by ASTM Procedure D1053-54T. It is tested for solvent resistance by ASTM Procedure D471-54T and shows the following:

| Solvent | Volume % Swell |
|---|---|
| Acetone | 250 |
| Benzene | 65 |
| 70:30 isooctane:toluene | 65 |
| Dioctyl sebacate | 15 |
| hydraulic fluid | |

Tensile strength and elasticity are measured by the usual stretching methods. There is 100 percent elongation at 361 pounds per square inch cross-section and 200 percent at 470 psi. Break occurs at 482 psi at which point there is 260 percent elongation and a permanent deformation of 18 percent.

Isolated polymer was also obtained by freezing latex II in dry ice and then warming it to room temperature with the result that the solids separated as an agglomerate which was washed several times with water to remove the emulsifier and salts and dried. The isolated polymer (82 percent conversion) was rubbery.

Samples of the dried rubber were utilized to determine its glass transition temperature ($T_g$) which is the temperature region in which there is a change in properties from a rubbery or flexible to a brittle condition as measured by a discontinuity in a plot of refractive index vs. temperature on the polymeric material (cf. P. T. Flory, Principles of Polymer Chemistry, Cornell University Press, 1953). The method employed herein for measuring this value is that described in the Journal of Polymer Science, volume 3, pages 455 to 461 and 647 to 651. At a temperature below the glass temperature a polymer becomes more or less frangible, which is highly undesirable for many purposes. A low value of $T_g$ is therefore evidence of utility at comparably low temperatures. It was found that the glass transistion temperature of this polymer is −14° C.

EXAMPLE 7

Among the fluorochemical triazines which can be prepared from the alcohols are:

2,4-diamino-6-(ω-perfluorooctylundecyloxy)-s-triazine;

2,4-diamino-6-(ω-perfluoropropylpropyloxy)-s-triazine;

2,4-diamino-6-(ω-perfluorododecyldodecyloxy)-s-triazine;

2,4-dihydrazine-6-(ω-perfluoropropylpropyloxy)-s-triazine;

2,4-diamino-6-(ω-perfluorooctylpropyloxy)-s-triazine;

2,4-dihydrazino-6-(ω-perfluorododecyldodecyloxy)-s-triazine; etc.

These and the other triazines have the general formula:

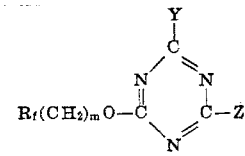

wherein $R_f$, $m$, X and Y are as previously defined herein. These compounds are valuable curing agents for epoxy-type resins (such as the bis phenol A-epichlorohydrin resin available commercially under the trade designation Epon 828) and thus provide a novel method of introducing chemically bound perfluoroalkyl groups into epoxy resins.

The condensation products of the triazines with formaldehyde also impart desirable hydrophobic and oleophobic properties to textiles such as cotton, wool, linen, silk and synthetic fibers as well as to non-woven mats or webs of fibers such as paper and felt. Thus, for example, the resin produced by refluxing together for from about one to 4 hours a triazine of the type defined by the foregoing general formula and concentrated aqueous formaldehyde can be dissolved in a suitable solvent, e.g., dioxane, in a concentration of about 1 percent and utilized to impregnate cotton cloth. The impregnated cloth can then be dried to remove the solvent and heated for five minutes or more at a temperature of from about 120 to 180° C. The resulting treated cloth samples are highly resistant to both oil and water type stains and retain their resistance to these stains to a remarkable degree even after repeated laundering.

Anothe use for the compounds of the invention and more particularly for their formaldehyde condensates is as hardening agents for alkyl-urea-formaldehyde, and melamine-formaldehyde resins. A simultaneous increase in the oil- and water-repellency of the surfaces of the resins so hardened is produced because of the fluorochemical chain introduced and chemically bound therein.

EXAMPLE 8

Several quaternary amine salt derivatives of the saturated alcohols are prepared as follows, except as otherwise specifically noted in the footnotes of the following table:

The ω-perfluoroalkyl alcohol and an excess of paraformaldehyde are dissolved in benzene by warming and anhydrous hydrogen chloride gas is passed into the warm solution until there is no further absorption. The excess hydrogen chloride and benzene are removed and the quaternizing agent is added to the residue (the molar ratio of the alcohol to the quaternizing agent being about 1:1). The resultant mixture is warmed whereupon it solidifies with the formation of the quaternary salt. This product is washed with anhydrous ether and dried.

retained. Under these conditions, the preferred concentration of treating solution ranges from about 0.5 to about 2 percent. The cloth is then dried for about 10 to 30 minutes at 40° to 100° C. and the treatment is fixed by heating the cloth for about 5 to 30 minutes at from about 100 to 140° C. The fixed, treated cloth is washed for about 30 minutes in an aqueous solution containing 0.1 percent w/v of sodium lauryl sulfate and 0.2 percent w/v sodium carbonate, at about 50° to 60° C., rinsed thoroughly and again dried.

The effectiveness of the treatments is determined by means of tests for spray rating, oil repellency rating and the visual estimation of soil repellency both before further treatment and after one or more cycles of laundering and/or dry cleaning.

For test purposes, laundering is accomplished by washing in an automatic washing machine of the stationary type using a detergent under normal household procedures or by means of a standard 60 minute cycle in a Launder-O-Meter, using chip soap as specified in ASTM D-496. Dry-cleaning is performed by available commercial procedures employing, for example, perfluoroethylene or naphtha.

Treating solutions are prepared as described above by warming one part of sodium acetate trihydrate and two parts of the quaternary salt in 100 parts of water. Samples of cotton jeans cloth are treated with the respective solutions, dried at 100° C. for 30 minutes, heated for 5 minutes at 135° C. (except for sample E which is heated for 5 minutes at 121° C.), washed and dried as described above and rated as follows (the Spray Rating being as previously disclosed herein and the Oil Repellency being the previously described mineral oil-n-heptane test):

| Alcohol | Quaternizing agent | Quaternary salt | Remarks re the quaternary salt | Salt designation |
|---|---|---|---|---|
| $C_8F_{17}(CH_2)_5OH$ | Pyridine | $[C_8F_{17}(CH_2)_5OCH_2N\text{-pyridyl}]^+ Cl^-$ | Solid; analytical: calc.: N, 2.21%; found: N, 2.20%. | A |
| $C_8F_{17}(CH_2)_{11}OH$ | do | $[C_8F_{17}(CH_2)_{11}OCH_2N\text{-pyridyl}]^+ Cl^-$ | White crystals, M.P. about 78° C.; analytical: calc.: N, 1.95%; found: N, 1.99%. | B |
| $C_8F_{17}(CH_2)_{11}OH$ | Triethylamine | $[C_8F_{17}(CH_2)_{11}OCH_2N(C_2H_5)_3]^+ Cl^-$ | Solid; M.P. 85° C. upward; analytical: calc.: N, 1.90%, C, 42.4%, F, 43.6%; found: N, 2.04%, C, 42.4%, F, 38.1%. | C |
| $C_8F_{17}(CH_2)_{11}OH$ | Quinoline | $(C_8F_{17}(CH_2)_{11}OCH_2N\text{-quinolyl})^+ Cl^-$ | Solid, M.P. 120-125° C., analytical: calc.: N, 1.83%, C, 45.5%, F, 42.1%; found: N, 2.08%, C, 46.2%, F, 39.0%. | D |
| $C_8F_{17}(CH_2)_{11}OH$ [1] | Pyridine | $[C_8F_{17}(CH_2)_{11}OCH_2N\text{-pyridyl}]^+ Br^-$ | Solid, softens at about 90° C., analytical: calc. (for monohydrate): N, 1.84%, C, 39.4%, Br, 10.5%; found: N, 2.3%, C, 39.2%, Br, 13.7%. | E |

[1] Anhydrous hydrogen bromide gas is used in place of hydrogen chloride.

Soil-resistant, water- and oil-repellent cloth is produced using these quaternary salts (and similar salts prepared from the other alcohols of the invention as follows:

The treating solution is prepared by warming sodium acetate trihydrate and the selected treating agent in water at the desired concentrations, which can range from about 0.1 to about 5 percent, at about 30 to 40° C. until solution is effected. The cloth to be treated is soaked in this solution for one minute, removed and squeezed so that a weight of solution approximately equal to 75 to 125 percent of the weight of the cloth is

| Salt Designation | Oil Repellency | Spray Rating | %F on Fabric |
|---|---|---|---|
| B | 80 | 90 | 0.9 |
| C | 50+ | 80 | 0.23 |
| D | 70 | 80 | —** |
| E | 100 | 70 | 0.5 |

** Not determined

All show appreciable soil resistance and retain appreciable percentage of oil- and water-repellency after laundering or dry-cleaning. Substantially the same results are observed when nylon and woolen fabrics are similarly treated.

EXAMPLE 9

Diurethanes, which are useful in the treatment of textile fabrics, can be prepared by the reaction of the saturated alcohols with diisocyanates. The following is exemplary of this:

0.665 G. (.0014 moles) of 3-(perfluorooctyl)-propanol and 2.177 g. of toluene are added to a vial, the vial is warmed until solution has occurred and 0.1218 g. (.0007 moles) of toluene diisocyanate are added. A trace of phenyl mercury acetate is added as a catalyst. The vial is sealed and heated at 65° C. for 1 hour, 105° C. for 2 hours and 14 hours at 65° C. Solution is complete throughout the entire heating period. The reaction mixture is cooled and the product diurethane forms a lower layer in the toluene. The toluene is removed by evaporation under vacuum leaving a clear solid melting at about 50–55° C.

A 1 percent solution of the diurethane in a 10/90 acetone/1,1,1-trichloroethane mixture is padded onto various textile fabrics which are then nipped, air dried overnight and tested with the following results:

| Fabric | Oil Repellency Rating (1) | Spray Rating (2) |
| --- | --- | --- |
| Cotton fabric | 140 | 50 |
| Wool gabardine | 150 | 80 |
| Nylon | 130 | 70 |
| Viscose rayon | 140 | 50 |

(1) Oil repellency ratings based on failure of penetration of mixture of mineral oil ("Nujol") and n-heptane for three minutes. The ratings corresponding to the highest percentages (by volume) of heptane repelled are: 80% heptane, 130; 90% heptane, 140; 100% heptane, 150.

(2) Spray rating test procedure as previously disclosed herein.

What is claimed is:

1. A perfluoroalkyl-alkyl acrylate of acrylic or methacrylic acid and an $\omega$-perfluoroalkyl-substituted alkanol having 3 to 12 methylene groups per molecule and in which the perfluoroalkyl radical has from three to 12 carbon atoms.
2. 3-(Perfluorooctyl)-propyl acrylate.
3. 11-(Perfluorooctyl)-undecyl acrylate.
4. 11(Perfluorooctyl)-undecyl methacrylate.
5. 3-(Perfluoropropyl)-propyl methacrylate.
6. 5-(Perfluorooctyl)-pentyl methacrylate.

* * * * *

UNITED STATES PATENT OFFICE
CERTIFICATE OF CORRECTION

Patent No. 3,818,074                    Dated June 18, 1974

Inventor(s)  Arthur H. Ahlbrecht

It is certified that error appears in the above-identified patent and that said Letters Patent are hereby corrected as shown below:

Col. 3, line 11, add -- ) -- after "($CH_2$" in the two formulas.

Col. 4, line 47, "11-(perfluorododecyl)undecanol-1" should read -- 11-(perfluorooctyl)undecanol-1 -- .

Col. 5, line 42-3, change "Na CHL2SiO$_3$·9H$_2$O" to read -- $Na_2SiO_3 \cdot 9H_2O$ -- .

Col. 10, line 52, remove one of the two parens immediately preceding "11-perfluorooctyl".

Col. 10, line 54, change "0.3770" to -- 1.3770 -- .

Col. 12, line 63, change "500°C." to -- 50°C. -- .

Col. 13, line 49, "to", first occurrence, should read -- on -- .

Col. 13, line 51, change "stanolind" to -- Stanolind -- .

Col. 16, line 27, change "transistion" to -- transition -- .

Col. 16, line 46, change "Y" in the formula to -- X -- .

Col. 16, line 50, change "Z" in the formula to -- Y -- .

Signed and sealed this 13th day of May 1975.

(SEAL)
Attest:

RUTH C. MASON
Attesting Officer

C. MARSHALL DANN
Commissioner of Patents
and Trademarks